United States Patent [19]

Oh et al.

[11] Patent Number: 5,487,878
[45] Date of Patent: Jan. 30, 1996

[54] METHOD FOR PREPARING PERPENDICULARLY MAGNETIZABLE MATERIAL USABLE ON MAGNETIC RECORDING MEDIA

[76] Inventors: Young Jei Oh, 47, Yoido-Dong Hansung Apt. A-805, Yongdungpo-Ku, Seoul; Jin-Ho Choy, Daechi-Dong Mido Apt. 110-202, Kangnam-Ku, Seoul; Hyung Jin Jung, 208-22, Kueui-Dong Kungjeon Villa Na-102, Sungdong-Ku, Seoul; Yang Su Han, 214-192, Sangdo 4-Dong, Dongjak-Ku, Seoul; Seung Wan Song, 214-6, Shingil 4-Dong, Yongdungpo-Ku, Seoul, all of Rep. of Korea

[21] Appl. No.: 299,580

[22] Filed: Sep. 1, 1994

[51] Int. Cl.$^6$ .................................................. C01G 1/00
[52] U.S. Cl. ....................... 423/140; 106/37; 106/286.2; 106/286.3; 106/286.6; 252/62.63; 423/151; 423/158; 423/594; 423/632; 423/635; 427/128; 428/694 R; 428/900
[58] Field of Search ................................. 427/127–132; 428/900, 694, 695, 694 R; 252/62.54, 62.63; 423/151, 155, 140, 635, 158, 594, 632; 106/37, 286.3, 286.2, 286.6

[56] References Cited

U.S. PATENT DOCUMENTS 3,330,697   7/1967   Pechini .................................. 117/215

*Primary Examiner*—Bernard Pianalto
*Attorney, Agent, or Firm*—Scully, Scott, Murphy & Presser

[57] ABSTRACT

A method for preparing a perpendicularly magnetizable material usable on magnetic recording media comprises the steps of: dissolving at least one member of the group consisting of strontium chloride and strontium nitrate with at least one member of the group consisting of iron chloride and iron nitrate in distilled water; adding citric acid to the resultant solution; controlling the pH of the solution to a range sufficient to completely dissociate the citric acid; heating the resultant solution with stirring to yield a gelatinous precursor; and subjecting the precursor to a temperature sufficiently high to remove the organic constituents thereof, which is characterized by controlling the pH of the solution to gelate the solution without the use of ethylene glycol, and can provide a perpendicularly magnetizable material superior in magnetic and particle properties.

1 Claim, 1 Drawing Sheet

METHOD FOR PREPARING PERPENDICULARLY MAGNETIZABLE MATERIAL USABLE ON MAGNETIC RECORDING MEDIA

BACKGROUND OF THE INVENTION

1. Field of the Invention

The present invention relates, in general, to a method for preparing a perpendicularly magnetizable material usable on magnetic recording media and, more particularly, to a method employing a citric acid sol-gel technique without polyhydroxy alcohol to prepare Sr-ferrite simply, thereby improving the material in particle size and coercive force.

2. Description of the Conventional Art

Sr-ferrite, known as a material for permanent magnets, is utilized as a perpendicularly magnetizable material on magnetic recording media like Ba-ferrite. As magnetic media are required to possess higher data storage density, the magnetic material is required to have a higher coercive force.

The magnetic properties of a ferrite material are largely changed depending on its particle size, particle size distribution, shape, purity, and size and distribution of pores on its surface.

In order to be utilizable as a perpendicularly magnetizable material on high performance magnetic recording media, Sr-ferrite powder is required to be fine in size and uniformly distributed and to have a particle shape of a hexagonal plate. The reason for this is that as the particles become more fine and uniformly distributed, single domain orientation is more strongly induced, and that as they become closer in shape to hexagon, the shape anisotropy increases, inducing a higher coercive force.

In consideration of these factors, various techniques have been developed for the preparation of ferrite powder and are prevalent. Of these techniques, representative ones include a solid state synthesis, a coprecipitation technique, a hydrothermal synthesis, a sol-gel technique and glass-crystallization.

Solid state synthesis comprises the step of sintering a starting oxide at high temperatures for a long period of time to obtain a single phase of ferrite. This step, however, may cause the abnorminal grain growth (2 to 3 µm), making the attainment of single domain orientation difficult. In addition, incorporation of impurities is likely to occur during a mixing step in the solid state synthesis, having a detrimental effect on its magnetic properties.

To overcome the disadvantages encountered in the solid state synthesis technique, a variety of wet synthesis techniques have been developed and include, as mentioned above, coprecipitation, hydrothermal synthesis, and alkoxide sol-gel synthesis.

The coprecipitation technique is mainly hydroxide and oxalate method. When precursors are synthesized by the coprecipitation technique, it is important to obtain a stoichiometric compound. In particular, in the case of hydroxide and oxalate method, a stoichiometric compound is difficult to obtain due to the large solubility difference between $Sr(OH)_2$ and $Fe(OH)_3$, and $SRC_2O_4$ and $Fe_2(C_2O_4)_3$ in an aqueous solution.

In addition, since aggregation of particles is unavoidable during the drying and calcination of coprecipitated precursor, it is difficult to make the particles fine, which subsequently degrades the coercive force.

With regard to the hydrothermal synthesis technique, a precipitate is initially formed as in the above mentioned hydroxide coprecipitation technique and then heated under pressure to yield a powder. Accordingly, the magnetic particles are improved in dispersibility by the activation of particle surface in the hydrothermal synthesis. However, in the hydrothermal synthesis technique, it is difficult to obtain a quantitative precipitation, so that extreme fluctuation in composition may occur. This, in turn, results in a problem that differences in coercive force may occur in accordance with the synthesis conditions.

An alkoxide technique, which utilizes the hydrolytic decomposition of metal-alkoxide, is effective for forming fine particles. But, the metal-alkoxide materials themselves are very expensive and difficult to handle due to their high hygroscopicity. In addition, in order to obtain a quantitative oxide, the hydrolysis conditions such as pH, temperature and concentration of a solution must be controlled precisely, but no general process for controlling the hydrolysis rate of the metal-alkoxide compound has been developed yet.

As another wet method, there is adopted a glass-crystallization technique. In this technique, a mixture of SrO and $Fe_2O_3$ is well blended with a proper flux, such as $B_2O_3$ or $SiO_2$ and the substance is melted. In this technique, a high temperature, for example, above 1,300° C., is required, and additional processes are necessary for removing the flux from the final products. As a result, the glass-crystallization technique has the problems that the production cost is high and the procedure is complicated.

U.S. Pat. No. 3,330,697 discloses a citric acid sol-gel technique which produces a fine powder by mixing citric acid with a metallic ion solution and adding to this mixture ethylene glycol to be used as a chain-forming agent to induce polymerization. This technique is advantageous in that the starting substance is relatively inexpensive and the synthetic procedure is relatively simple.

BRIEF DESCRIPTION OF THE DRAWINGS

The FIGURE shows magnetic hysteresis curve of Sr-ferrite powder resulting from the present method.

SUMMARY OF THE INVENTION

Figure 1:
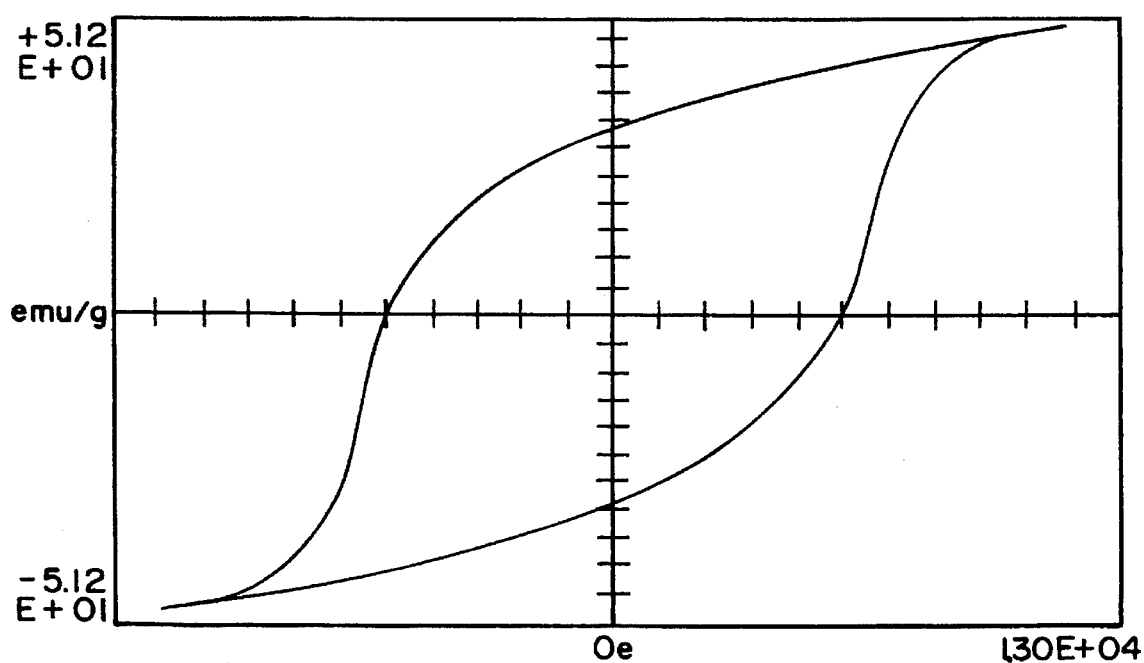

Therefore, an object of the present invention is to overcome the problems encountered both in the conventional techniques and in wet chemical processes and to provide a method for the preparation of perpendicularly magnetizable material suitable for magnetic recording media, which is capable of improving the magnetic and particle properties of the material.

In accordance with the present invention, the above object can be accomplished by the provision of a method for preparing a perpendicularly magnetizable material suitable for magnetic recording media, comprising the steps of: dissolving at least one member of the group consisting of strontium chloride and strontium nitrate with at least one member of the group consisting of iron chloride and iron nitrate in distilled water; adding citric acid to the resultant solution; controlling pH of the solution to a range sufficient to dissociate the citric acid completely; heating the solution with stirring to yield a gelationous precursor; and subjecting the precursor to a temperature sufficiently high to remove the organic residue thereof.

These and other objects and advantages of the present invention will become more apparent from the following detailed description.

DETAILED DESCRIPTION OF THE INVENTION

In accordance with the present invention, a reaction solution containing citric acid and a metal ion can undergo an effective gelation by controlling the degree of dissociation of the citric acid, a weak acid, and the reaction of the citric acid and the metal ion can be facilitated by the regulation of pH of the reaction solution without using ethylene glycol, a chain-forming agent introduced in the conventional citric acid sol-gel process.

Since citric acid is a triprotic acid, its complexing ability become enhanced when a solution containing citric acid and a metal ion is controlled to have such a pH as to dissociate the three hydrogen ions of the citric acid completely. The citrate has a strong tendency to form a complex of metal-citrate, leading to gelation without ethylene glycol.

When ligands capable of reacting with metal ions to form precipitates are present in a solution, it is very likely to form an undesirable precipitate of metal salts, such as metal-hydroxides and metal chlorides. However, the formation of the precipitates of metal salts is strongly affected by the pH of solution and thus can be prevented by controlling the pH.

Particularly, when synthesizing Sr-ferrite magnetic powder through the sol-gel technique using citric acid, component metal ions are homogeneously combined in a solution in accordance with the present invention. Thus the segregation of the component metal elements, a representative problem of the conventional solid state method, is prevented and the homogeneity obtained in the solution is maintained during the gelation, because the citrate gel is highly viscous. Accordingly, the present invention is capable of yielding precursors in which the metal ions are homogeneously distributed.

In addition, according to the present invention, the gelation can take place without the use of polyhydroxy alcohol, e.g. ethylene glycol, simply by adjusting the pH value of the solution to a range enough to execute the gelation. Consequently, the present invention is advantageous in its reduction of the production cost and in its simplification of the procedure. Moreover, the reduction of the used organic content makes it possible to obtain nonagglomerated fine powders by reducing the self-combustion heat during the calcination process.

As a component for the perpendicularly magnetizable material of the present invention, at least one member of the group consisting of the chloride and nitrate of strontium may be used.

The ferrite precursors synthesized by the sol-gel method of the present invention using citric acid may be calcined by an ordinary simple thermal treatment, to give fine strontium ferrite powder having a particle size of <0.1 μm and a coercive force of not less than 6,000 Oe.

Through description of the following examples, detailed procedures for performing the present method and the detailed magnetic properties and characteristics of the perpendicularly magnetizable material usable on magnetic recording media will be made more apparently.

EXAMPLE 1

1.5 g of $Sr(NO_3)_2$ and 32.3 g of $Fe(NO_3)_3 \cdot 9H_2O$ were dissolved in distilled water, followed by addition of 50 g of citric acid ($C_6H_8O_7$) to the aqueous solution. Ammonia water ($NH_4OH$) was added dropwise, to adjust the pH of the resulting solution to about pH 7.0. Thereafter, the solution was heated with being stirred, to evaporate the distilled water out of the solution. This evaporation resulted in gelation of the solution, to yield an amorphous gel-type precursor. This precursor was subjected to thermal treatment at 500° to 600° C. for 0.5 to 2 hours, to remove the organic materials from the precursor.

The obtained Sr-ferrite precursor powder was pelletized to form a disk shaped specimen. This was charged in an electric furnace and slowly heated to 800° to 900° C. over 4 to 6 hours. After the temperature was maintained for 2 to 3 hours, it was slowly cooled to room temperature naturally, to complete the preparation of the ferrite.

The Sr-ferrite magnetic powder yielded by the above procedure was tested for powder and magnetic properties according to the following characterization technics:

Coercive Force, Squareness Ratio, Saturation Magnetization, Remnant Magnetization-VSM Particle Size and Shape-TEM, SEM From the results obtained by the test, a hysteresis loop was drawn as shown in FIG. 1.

The magnetic and powder properties were measured as follows:

Coercive Force (iHc):6,500 Oe

Remnant Magnetization ($\sigma_r$):33 emu/g

Saturation Magnetization ($\sigma_s$):50 emu/g

Squareness Ratio (SQ):0.66

Particle Size:≦0.1 μm.

EXAMPLE 2

Sr-ferrite magnetic powder was prepared in the same manner as in Example 1, except that the sample was subjected to thermal treatment at 750° to 850° C. for 2 to 4 hours.

The Sr-ferrite magnetic powder was tested for its magnetic and powder properties. The results of the test are given as follows:

Coercive Force (iHc):6,200 Oe

Remnant Magnetization ($\sigma_r$):32 emu/g

Saturation Magnetization ($\sigma_s$):51 emu/g

Squareness Ratio (SQ):0.63

Particle Size:≦0.1 μm

EXAMPLE 3

Sr-ferrite magnetic powder was prepared in the same manner as in Example 1, except that the sample was subjected to thermal treatment at 850° to 950° C. for 1 to 3 hours.

The ferrite magnetic powder was tested for its magnetic and powder properties. The results of the test are given as follows:

Coercive Force (iHc):6,070 Oe

Remnant Magnetization ($\sigma_r$):34 emu/g

Saturation Magnetization ($\sigma_s$):56 emu/g

Squareness Ratio (SQ):0.6

Particle Size:≦0.1 μm.

From the above examples, it is apparent that the Sr-ferrite prepared by the citric acid sol-gel method of the present invention is a fine powder with a particle size of not more than 0.1 μm and has a coercive force of not less than 6,000 Oe.

Other embodiments of the invention disclosed herein will be readily apparent to those of ordinary skill from the foregoing disclosure. In this regard, while specific embodiments of the invention have been described in considerable detail, variations and modifications of these embodiments can be effected without departing from the spirit and scope of the invention as claimed.

What is claimed is:

1. A method for preparing a perpendicularly magnetizable material usable on magnetic recording media, comprising the steps of:

dissolving at least one member of the group consisting of strontium chloride and strontium nitrate with at least one member of the group consisting of iron chloride and iron nitrate in distilled water;

adding citric acid to the resultant solution;

controlling the pH of the solution to a range sufficient to completely dissociate the citric acid;

heating the resultant solution with stirring to yield a gelatinous precursor;

subjecting the precursor to a temperature sufficiently high to remove the organic constituents thereof; and calcining the precursor under conditions sufficient to provide a perpendicularly magnetizable material.

* * * * *

UNITED STATES PATENT AND TRADEMARK OFFICE
CERTIFICATE OF CORRECTION

PATENT NO. : 5,487,878
DATED : January 30, 1996
INVENTOR(S) : Young Jei Oh, et al.

It is certified that error appears in the above-indentified patent and that said Letters Patent is hereby corrected as shown below:

Column 1, line 62: "SRC$_2$O$_4$" should read -- SrC$_2$O$_4$ --

Column 4, line 58: "($\sigma_r$)" should read -- ($\sigma_r$) --

Signed and Sealed this

Tenth Day of September, 1996

Attest:

BRUCE LEHMAN

*Attesting Officer*  *Commissioner of Patents and Trademarks*